3,829,380
METHOD AND APPARATUS FOR CLEANING WASTE LIQUID CONTAINING DILUTED DYE
Saburo Oohara, Kyoto, Japan, assignor to Kanebo Ltd., Tokyo, Japan
Filed May 19, 1972, Ser. No. 254,868
Claims priority, application Japan, May 24, 1971, 46/35,350; Oct. 25, 1971, 46/84,569
Int. Cl. C02c 5/02
U.S. Cl. 210—30    14 Claims

ABSTRACT OF THE DISCLOSURE

A liquid containing diluted anionic dyes or disperse dyes is cleaned by specific polyamide fibers having a high diluted dye absorption coefficient for the dye of at least 0.5 and at least 150 meq./kg. of amino group, which are contained in an absorption column through which the liquid is circulated, and the cleaned liquid is returned into the dyeing system for the next process.

FIELD OF THE INVENTION

Figure 1:
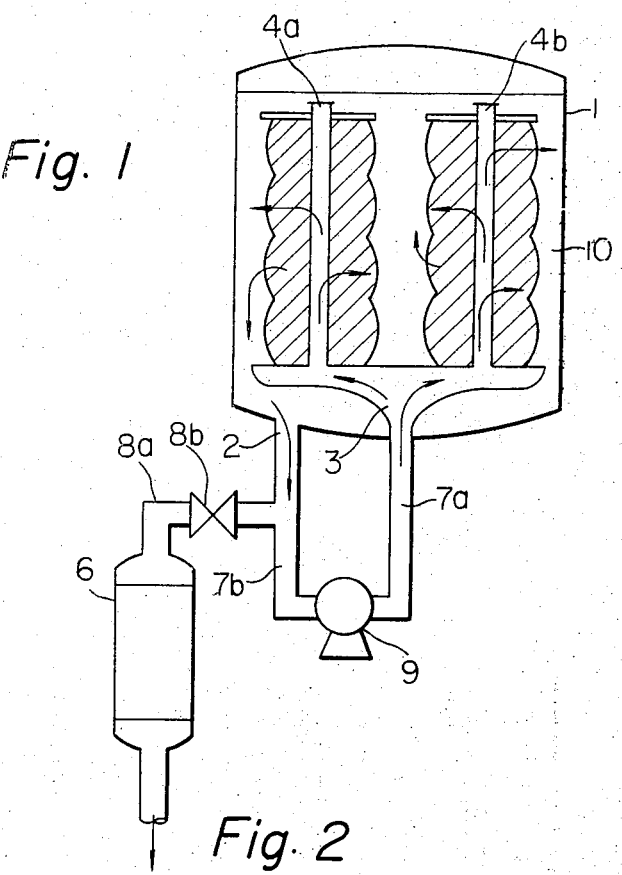

The present invention relates to a method and apparatus for cleaning liquid containing diluted dye, more particularly, relates to a method and apparatus for cleaning liquid containing diluted anionic dyes or disperse dyes.

BACKGROUND OF THE INVENTION

Protection of the human environment from pollution due to wastes from industries has recently become important and waste liquid containing dyes and auxiliaries for dyeing frequently causes pollution.

In order to decolorize and clean the waste liquid containing dyes, various methods have been attempted. For example, the dyes and the auxiliary agents dissolved in the waste liquid from dyeing process or dye-production process have been oxidized by blowing ozone gas into the liquid in order to decolorize them, they have been aggregated by adding a coagulating agent into the liquid in order to precipitate them, or they have been absorbed by adding active carbon into the liquid in order to clean it.

However, due to the economical disadvantages of high cost of equipment and operations, the above-mentioned methods are not widely utilized. In practice, cleaning the waste liquid containing dye has a special difficulty in comparison with other waste liquids. That is, the solutes such as dyes and auxiliary agents for dyeing are dissolved in the dyeing liquid in a very small concentration, and the dilutes solutes are further diluted several times with additional liquids such as cooling water and rinsing water mixed into the waste liquid. Such small concentration of the solutes in the waste liquid results in poor efficiency in removal of the solutes from the waste liquid. Particularly, anionic dyes including acid dyes, acid mordant dyes, metallized acid dyes, direct dyes and reactive dyes and disperse dyes are difficult to remove due to their high solubility and dispersing properties in water.

Therefore, it is important for protecting the human environment from pollution by waste liquid containing diluted dye to provide a method and equipment effective for cleaning the waste liquid, particularly, containing the anionic dyes and disperse dyes.

An object of the present invention is to provide a method and apparatus for cleaning waste liquid including diluted anionic dyes or disperse dyes in a high efficiency with simple operation.

Another object of the present invention is to provide a method and apparatus capable of cleaning waste liquid containing diluted anionic dyes or disperse dyes and of clearing the dyed material with the cleaned waste liquid with high economy of heat and water.

A further object of the present invention is to provide an absorbing material useful for absorbing diluted dyes from waste liquid with high efficiency.

THE INVENTION

The above-stated objects are accomplished by the method and apparatus of the present invention wherein a waste liquid from a dyeing process or dye-production process is brought into contact with an absorbing material consisting of polyamide fibers and contained in an absorbing column which is connected to a container for the waste liquid.

The polyamide fibers usable for the present invention have a diluted dye absorption coefficient of at least 0.5 for the dye to be absorbed. The diluted dye absorption coefficient is determined by the following procedure. One litre of dyeing liquid is prepared by dissolving or dispersing a dye to be absorbed in a liquid in a concentration of 200 p.p.m. Five grams of the polyamide fibers are treated with the dyeing liquid at a temperature of 60° C. The treating time required for lowering the dye concentration in the dyeing liquid to 5 p.p.m. is measured. The diluted dye absorption coefficient is determined from the ratio of 60 seconds to the treating time thus measured.

It is known that a special polyamide fiber containing 150 meq./kg. or more of amino groups including primary, secondary and tertiary amino groups has a high dye absorbing property, and therefore, is usable for high bulky articles which are to be dyed at a relatively low temperature. However, it is also known that the special polyamide fiber having such a high dye absorbing property has mechanical strengths, for example, tensile, tear and abrasion strengths much lower than those of the normal polyamide fibers which usually contain 20 to 50 meq./kg. of amino groups. Therefore, in order to obtain special polyamide fiber having a high dye absorbing property and high and uniform mechanical strengths, it is necessary to produce the fiber through a very complicated process under very severe control. This results in high production cost and thus in restriction of uses of the resultant fibers.

In the art of the present invention, the special polyamide fiber is utilized as an absorbing material for completely absorbing dyes in the waste dyeing liquid. Accordingly, it is necessary that the special polyamide fiber be in a form effective for absorbing the dye at high efficiency but it is unnecessary that the special polyamide fiber have high strength and uniformity. Therefore, it is possible for this special polyamide fiber to be produced by a simple process at low cost. This effectively expands the field wherein the special polyamide fiber is used.

The special polyamide fiber having a high content of amino groups is easily produced from a polyamide containing, as a copolycondensation component, polyamines such as diethylenetriamine, triethylenetetramine, N,N'-bis-aminopropylethylene diamine and N,N'-bis-aminopropyl piperazine, and polyamine derivatives wherein hydrogen atom in the secondary amino group of the above-mentioned polyamide is substituted by an alkyl group so as to convert the secondary amino group to a tertiary amino group. Also, the special polyamide fiber may be produced from a copolycondensated polyamide which is produced from a salt of the above-mentioned polyamine with a dicarboxylic acid, for example, adipic acid, sebacic acid, terephthalic acid and iso-phthalic acid by the method as disclosed in Japanese Patent Application Publication No. 675/1966. Especially, the absorbing material most useful for the art of the present invention is a polyamide fiber produced from the reaction product of a primary polyamine having a high molecular weight of at least 1,000 with a polyamide at a temperature at which they are both molten. Such a polyamide fiber can absorb the dye at a high absorbing velocity and has a large absorbing capacity for the dye. This is probably due to the fact that the high molecular weight polyamine group which has been combined with the polyamide through the amide-exchange reaction tends to distribute at the surface portion of the fiber and exists in amorphous regions of the fiber in a high concentration.

The high molecular weight polyamine may be selected from polyethyleneimines.

The polyamide fibers having a high content of amino groups can absorb the anionic dyes mordant and such as acid dyes, acid mordant dyes, metallized acid dyes, reactive dyes and direct dyes and disperse dyes including normal disperse dyes and metallized disperse dyes at a high velocity. Particularly, the polyamide fiber produced from the polyamide containing polyamine and a component effective for interrupting crystallization of the polyamide, is useful as an absorbing material not only for the anionic dyes but for the dispersed dyes. For example, a polyamide fiber produced from a molten mixture of a polyamide, with a polyester as the crystallization interrupting component and a high molecular weight polyamine is an excellent absorbing material for the art of the present invention.

In the method of the present invention, it is desirable to add an auxiliary agent into the waste liquid before the cleaning process in order to accelerate the absorbing velocity of the absorbing material.

The absorbing material consisting of the polyamide fibers has not only the advantages that it can be easily handled, but the advantage that it has an effective surface area per unit weight which is larger than that of the active carbon.

In order that the polyamide fiber have a large effective surface, it is desirable that the fiber have a denier 20 or less preferably, 10 or less, more preferably, 3 or less. Particularly, the fine polyamide fibers having an individual fineness of 1 denier or less are useful for the art of the present invention.

The melt-spun polyamide filaments may be drawn or undrawn. Sometimes, the undrawn filaments are preferable.

The polyamide fiber useful for the present invention can be economically rejuvenated after saturating the dyes. That is, the saturated fibers can be desorbed or decolored by a suitable treatment.

Usually, the saturated polyamide fibers are treated with an alkaline solution containing sodium hydroxide, potassium hydroxide, sodium carbonate or potassium carbonate and, if necessary, a surface active agent, oxidizing agent or reducing agent.

In the method of the present invention, the polyamide fibers are charged into an absorbing column. In this case, the filling density and arrangement of the polyamide fibers in the column are very important factors for carrying out the cleaning of the diluted dye-containing waste liquid at a high efficiency. These factors have large influences on lowering to the utmost the resistance of the polyamide fiber layer to the flow of the liquid therethrough and on enhancing the absorbing efficiency as high as possible. When the filling density of the polyamide fibers is low, the flow resistance is lowered so as to increase the flow rate of the liquid through the polyamide fiber layer. However, in this case, the contact of the liquid with the polyamide fiber is decreased and this results in low absorbing efficiency of the absorbing column. On the contrary, when the filling density of the polyamide fibers is high, the flow resistance becomes high so as to decrease the flow rate of the liquid through the polyamide fiber layer. This also results in a low absorbing efficiency of the absorbing column.

The inventors have discovered that it is preferable for the polyamide fibers to be charged into the absorbing column in a filling density of 0.05 to 0.6 g./cm.$^3$, more preferably, 0.1 to 0.3 g./cm.$^3$. Further, it was observed that if the polyamide fibers are filled in different arrangements even in the same filling density, the flow resistances of the filled fibers differ from each other. That is, in the case where the polyamide fibers are bonded in bundle form and the bundles are arranged with the fibers parallel to the direction of flow of the liquid through the absorbing column, the polyamide fiber layer has a relatively low flow resistance even when the fibers are filled in a relatively high density.

The polyamide fiber may be formed into a woven, knitted or non-woven fabric rather than bundles. In this case, if the fibers are arranged to lie substantially in the same direction as the direction of flow of the liquid, the liquid can be cleaned at a high efficiency. However, the fibers in the fabric have a freedom of movement lower than the fibers in the bundles, so that the contact of the fibers with the liquid is somewhat lowered. Therefore, in the case where the fabric is used as an absorbing material, it is desirable to fill the fabric into the absorbing column in a relatively high density in order to enhance the contact of the fiber with the liquid.

In the case where the waste liquid contains diluted anionic dyes other than reactive dyes, the waste liquid can be directly cleaned by the method of the present invention. However, in the case where the waste liquid contains the diluted reactive dyes, the waste liquid usually has a pH of 7 to 9 because after the material to be dyed completely absorbs the reactive dye in the dyeing liquid, the dyeing liquid is adjusted to the pH of 7 to 9 by adding an alkaline agent such as ammonia in order to react the reactive dye with the material. On the other hand, in order that the polyamide fibers having a high content of amino groups absorb the dye in a high efficiency, it is desirable that the waste liquid has a pH of at most 8.0, preferably, 6 or less. Therefore, it is necessary that the waste liquid containing the reactive dye and having a pH of 7 to 9 is adjusted to a pH of 6 or less by the addition of an acid such as hydrochloric acid, sulfuric acid or acetic acid before the waste liquid is passed into the absorbing column.

In the case where the material is dyed with acid mordant dye, the dyeing process is effected by the following procedures.

(1) Method 1

The material is treated with an aqueous solution of potassium dichromate and thereafter, dyed with a dyeing liquid containing the acid mordant dye.

(2) Method 2

The material is dyed with a dyeing solution containing the acid mordant dye together with potassium dichromate.

(3) Method 3

The material is dyed with a dyeing liquid containing the acid mordant dye, and then, treated with a treating liquid which is prepared by adding potassium dichromate into the waste dyeing liquid.

(4) Method 4

The material is dyed with a dyeing liquid containing the acid mordant dye, and then treated with a fresh aqueous solution of potassium dichromate.

In Methods 1 to 3, the dye and potassium dichromate in the waste dyeing liquid together form lake insoluble in water. The lake formation results not only in soiling of the dyeing system but in poor color fastness of the dyed material. Accordingly, Method 4 is most desirable in consideration of the workability of dyeing and color fastness of the dyed material. However, Method 4 has the disadvantages of poor economy in consumption of water, driving power, heat and time. Therefore, Method 3 or a modified Method 3 in which only a portion of the waste dyeing liquid is withdrawn, is utilized in practice.

However, by using the art of the present invention, Method 4 can be utilized without its disadvantages. That is, after the material absorbs the acid mordant dye from the dyeing liquid, the waste dyeing liquid is circulated through the absorbing column for about 5 to 10 minutes without withdrawing it from the dyeing system, in order to remove the dye. Since the cleaning is completed within a short time, the temperature of the waste dyeing liquid is prevented from decreasing.

The cleaned waste dyeing liquid which contains substantially no dye is returned into the dyeing system, desired amounts of potassium dichromate and a necessary auxiliary agent are added into the liquid, and then the dyed material is after-chromed with the liquid. In this after chroming, since the liquid contains no dye, no lake is formed in the liquid. This is effective for retaining the The resultant non-drawn and drawn filaments had diluted dye absorption coefficients for Cibacrolan Green G (trademark of an acid dye made by Ciba) as shown in Table 1.

The filament yarns were each charged in a glass absorbing column of inside diameter 3 cm. and length 80 cm. with the individual filaments in parallel with each other in a filling density of 0.2 g./cm.$^3$.

A dye solution containing 1,800 p.p.m. of Cibacrolan Green G and having a pH of 4.0 and a temperature of 60° C. was flowed through the glass absorbing column at a flow rate of 50 cc./min.

The columns cleaned the dye solution with the results as shown in Table 1.

In Table 1, Filaments 1 and 2 which had small diluted dye absorption coefficients of 0.3, are not usable for the present invention, but Filaments 3 to 11 are usable for the present invention.

TABLE 1

| Filament No. | Proportion of polycondensation components in parts | | Filament | | | | | Dye concentration in cleaned waste liquid |
|---|---|---|---|---|---|---|---|---|
| | Nylon salt | ε-Caprolactam | Cross-sectional profile | Drawing | Yarn count (denier/filaments) | Content of amino groups (meq./kg.) | Diluted dye absorption coefficient | |
| 1 | 3 | 97 | O | Non | 500/100 | 135 | 0.3 | 12.3 |
| 2 | 5 | 95 | O | Non | 200/100 | 285 | 0.3 | 11.6 |
| 3 | 4 | 96 | O | Non | 500/100 | 205 | 0.5 | 5.0 |
| 4 | 5 | 95 | O | Non | 500/100 | 285 | 0.8 | 1.5 |
| 5 | 10 | 90 | O | Non | 500/100 | 605 | 1.3 | 0 |
| 6 | 15 | 85 | O | Non | 500/100 | 790 | 2.0 | 0 |
| 7 | 20 | 80 | O | Non | 500/100 | 1,020 | 3.0 | 0 |
| 8 | 5 | 95 | O | Drawn | 160/100 | 285 | 0.5 | 4.5 |
| 9 | 5 | 95 | O | Non | 500/100 | 285 | 1.0 | 0.5 |
| 10 | 5 | 95 | O | Non | 200/100 | 285 | 1.5 | 0 |
| 11 | 5 | 95 | O | Non | 1,000/100 | 285 | 0.6 | 3.0 | dyeing system in a clear condition and enhancing the color fastness of the dyed material.

After the after-chroming is completed, the waste liquid is passed through an ion-exchange column containing an ion-exchange resin in order to remove the potassium dichromate from the waste liquid. The ion-exchanged waste liquid is usable for the next dyeing process, because the waste liquid contains no dye and no potassium dichromate. In the ion-exchange process, the waste liquid is preferably flowed through the dyed material in order to clear the dyed material.

The ion-exchange column must be located in a circulation system other than that of the absorbing column. If the waste dyeing liquid containing the acid mordant dye is passed through the ion-exchange column, a portion of the dye is undesirably absorbed by the ion-exchange resin. This undesirable absorption results in decrease of ion-exchange capacity of the column.

When the waste liquid containing potassium dichromate is passed through the absorbing column, the absorbing capacity of the absorbing column is decreased and the dye absorbed on the polyamide fibers in the column is undesirably desorbed through absorption exchange of the dye and the potassium dichromate.

As stated hereinbefore, it is necessary that the special polyamide fiber usable for the present invention has a diluted dye absorption coefficient of at least 0.5, more preferably, at least 1.0.

For instance, copolycondensation products were prepared by copolycondensing mixtures containing, in various proportions, a nylon salt consisting of an equimolar of triethylene tetramine and terephthalic acid and ε-caprolactam for 10 hours while flowing nitrogen gas through the reaction system. The resultant polyamides were washed with hot water and dried. The dried polyamides were melt-spun by a 20 mm. φ melt-spinning extruder into various non-drawn filament yarns. A part of each of the non-drawn yarns were cold-drawn so as to form drawn filament yarns having various contents of amino groups and finenesses.

As table 1 clearly indicates, the values of the content of amino groups in the filaments are proportional to the values of the diluted dye absorption coefficient. When the content of amino groups is 150 meq./kg. or more, the diluted dye absorption coefficient is 0.5 or more. However, the greater the denier of filament, the smaller the diluted dye absorption coefficient. Further, from Table 1, it is clear that in the case where the diluted dye absorption coefficient is lower than 0.5, the cleaning effect of the polyamide filaments is very poor. Generally, the polyamide filaments having a high diluted dye absorption coefficient have a large absorbing capacity and a long useful life. In the consideration of the such features, it is desirable that the polyamide fibers in the present invention have a diluted dye absorption coefficient of 1.0 or more.

As another example, a polycapramide having a relative viscosity of 2.70 measured in 1% solution in 95.8% sulfuric acid was uniformly mixed with a polyethyleneimine (trademark: PEI-12 made by Dow Chemical Co.) in various proportions. The mixtures were melt-spun into filaments of 200 denier/25 filaments having various contents of amino groups using a 20 mm. melt-spinning extruder.

The diluted dye absorption coefficients of the resultant non-drawn filaments were measured for Lanyl Brown 3R (trademark of a metallized acid dye made by Sumitomo Chemical Industrial Co.) in the following procedure. The dye was dissolved in water in a concentration of 200 p.p.m. and the solution was adjusted to a pH of 4.0 by adding acetic acid and to a temperature of 60° C. 5 g. of each of the polyamide fibers prepared above was treated with 1 litre of the dye solution with stirring. The treating time while the dye concentration lowered to 5.0 p.p.m. was measured. The diluted dye absorption coefficient is equal to the ratio of 60 seconds to the treating time in seconds.

Each filament was formed into staple form by cutting and charged into a glass absorbing column of inside diameter 3 cm. and length 50 cm. in an amount of 20 g. in a filling density of 0.2 g./cm.$^3$ at random.

An aqueous solution of Lanyl Brown 3R in a concentration of 100 p.p.m. was flowed through the absorbing column at a temperature of 60° C. at a flow rate of 100 cc./min. The quantity of the dye solution necessary for lowering the absorbing column to an absorbing capacity at which the cleaned dye solution contains 5 p.p.m. of the dye was measured. The measured quantity of the dye solution expresses the absorbing capacity of the column.

The results of the measurements are shown in Table 2.

TABLE 2

| Filament No. | Filament | | | |
|---|---|---|---|---|
| | Concentration of polyethylene imine (percent) | Content of amino groups (meq./kg.) | Diluted dye absorption coefficient | Absorbing capacity (litre) |
| 12 | 0.1 | 63 | 0.2 | 0 |
| 13 | 0.3 | 102 | 0.3 | 2.1 |
| 14 | 0.5 | 132 | 0.5 | 12.5 |
| 15 | 1.0 | 235 | 1.0 | 18.7 |
| 16 | 2.0 | 412 | 1.8 | 27.4 |
| 17 | 3.0 | 598 | 2.3 | 29.3 |
| 18 | 5.0 | 953 | 3.2 | 31.2 |

In Table 2, Filaments 12 and 13 which have a small diluted dye absorption coefficient are not usable for the present invention.

From Table 2, it is evident that the polyamide filaments usable for the present invention are required to have a diluted dye absorption coefficient of 0.5 or more, preferably, 1.0 or more in consideration of the absorbing capacity. In the case where the polyamide contains polyethyleneimine in an amount of amino groups of 150 meq./kg. or more, the resultant filament had an excellent absorbing capacity. Although the diluted dye absorption coefficient and the absorbing capacity of the polyamide filament increase with increase of the concentration of the polyethyleneimine in the mixture, the concentration of the polyethyleneimine is preferably at most 5% in consideration of the spinnability of the mixture.

The art of the present invention is applicable to clean the waste dyeing liquid from various kinds of dyeing machines such as dyeing liquid circulation type dyeing machines, for example, loose fiber dyeing machines, wool top sliver dyeing machines, package dyeing machine and hank dyeing machines and material circulation type dyeing machines, for example, winch type, rotary drum type, jigger type and paddle type dyeing machines. Also, the art of the present invention is applicable not only to aqueous dyeing waste liquid but to non-aqueous (organic solvent) dyeing waste liquid.

The method of the present invention can be easily carried out continuously and economically with a high efficiency by utilizing a simple and compact apparatus for cleaning the dyeing waste liquid.

DETAILED DESCRIPTION

Figure 6:
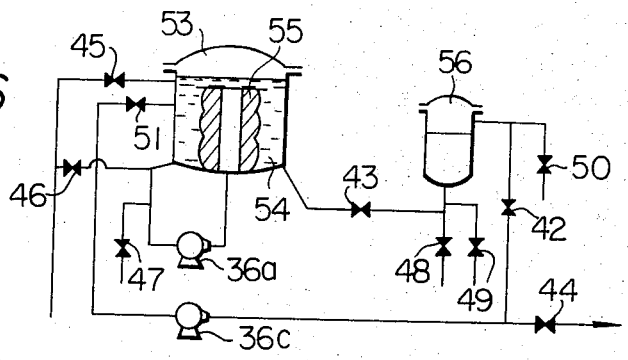
Figure 7:
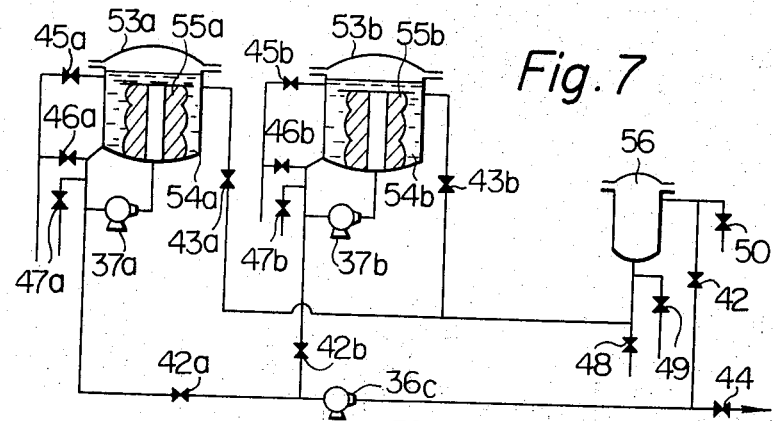
Figure 8:
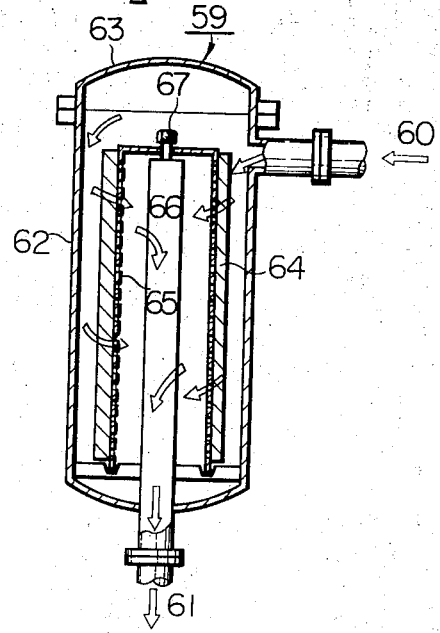
Figure 10:
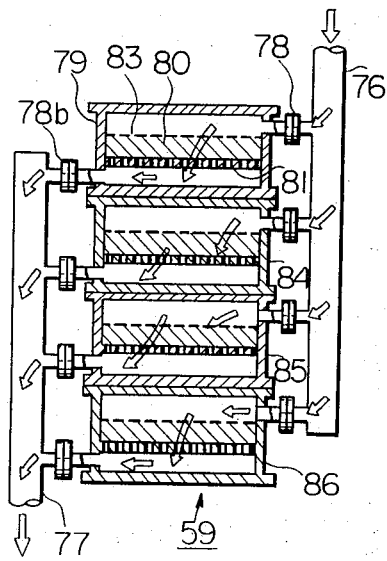
Figure 11:
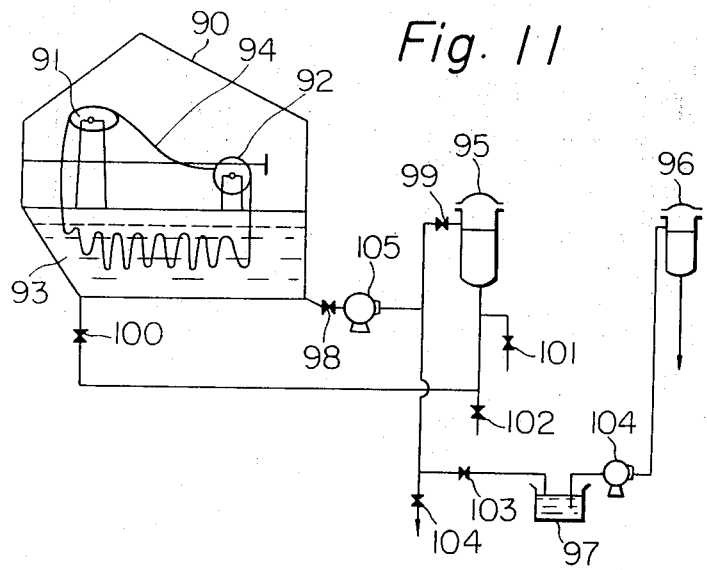

The features and advantages of the art of the present invention will be apparent to persons acquainted with the art upon reading the following illustration and studying the accompanying drawings, in which;

FIGS. 1 to 7 show systems for cleaning waste dyeing liquid from dyeing machines, FIGS. 8 and 10 are schematic cross-sectional views of absorbing columns usable for the present invention, and FIG. 11 shows a system for cleaning waste dyeing liquid from a winch type dyeing machine.

FIG. 1 shows a non-circulation type cleaning system wherein the method of the present invention is applied to the dyeing liquid circulation type package dyeing machine which is the so-called Obermaier type dyeing machine and waste dyeing liquid is cleaned in a non-circulation system. In FIG. 1, a dyeing tank 1 has holes 2 and 3 formed on the bottom thereof, and the holes 2 and 3 are connected to each other by conduits 7a and 7b through a pump 9. The hole 3 is also connected to the bottom ends of hollow spindles 4a and 4b located in the tank 1. The conduit 7b is connected to an absorbing column 6 containing absorbing material through a valve 8b and conduit 8a.

In the dyeing process, after the valve 8b is closed, the dyeing liquid is circulated through pump 9, conduit 7a hole 3, hollow spindles 4a and 4b, material 10 to be dyed, hole 2 and conduit 7b. When the dyeing is completed, the valve 8b is opened, the waste dyeing liquid in the tank 1 flows into the absorbing column 6 and the small amount of dye contained in the dyeing waste liquid is absorbed by the absorbing material in the absorbing column so as to clean the waste dyeing liquid to a colorless liquid, and then the cleaned waste liquid is discharged into a sewerage system or received in a waste liquid pit or tank. The waste pit or tank is very useful for effectively recovering the waste organic solvent from solvent dyeing systems.

Figure 2:
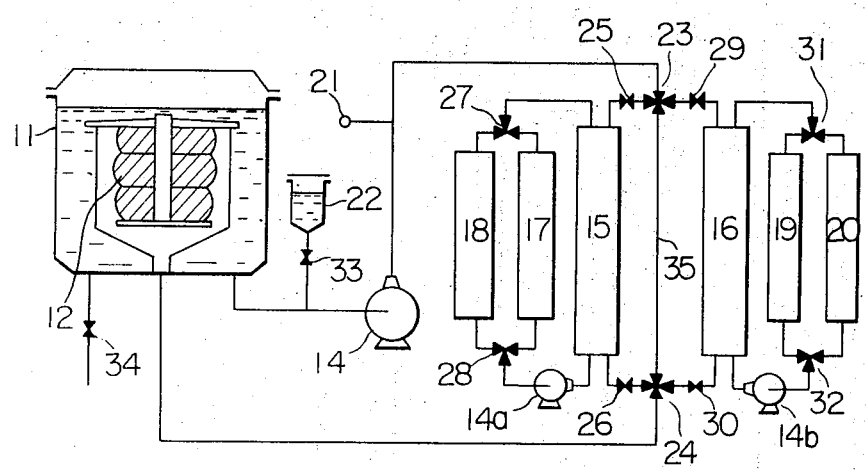

FIG. 2 shows a circulation type cleaning system wherein by circulating the dyeing waste liquid through a dyeing system and a cleaning system, the dye in the dyeing waste liquid is removed and the dyed material is cleared by the cleaned waste liquid. In FIG. 2, a dyeing liquid circulation type package dyeing machine 11 is connected to a pH-adjusting vessel 22 through a valve 33, and to a dye-absorbing column 15 and an ion-exchange column 16 which are arranged in by-pass to the circulation path of the dyeing liquid through four-way valves 23 and 24 and a pump 14. The dyeing liquid is circulated through the material 12 charged in a dyeing tank 11 by the action of the pump 14.

During the dyeing process, valves 25, 26, 29 and 30 are closed so that dyeing liquid can be circulated into the dyeing tank 11 through valves 23 and 24.

After the material 12 in the dyeing tank 11 sufficiently absorbs the anion dye in the dyeing liquid, the valve 25 and 26 are opened and the valve 23 and 24 are actuated so as to allow the waste dyeing liquid to flow to the dye-absorbing column 15. Then the waste dyeing liquid flows in the dye-absorbing column 15 and the dye in the waste dyeing liquid is absorbed by the absorbing material in the absorbing column 15 so as to clean the waste liquid. Thereafter, since the waste dyeing liquid contains little or no dye, the material 12 in the dyeing tank 11 is cleared by the cleaned waste liquid which is circulated through the material 12. After circulating the cleaned waste liquid for a predetermined period, valve 34 is opened and the waste liquid is discharged out of the system.

In the case where the dyeing liquid contains reactive dye, since it is necessary to adjust the pH of the dyeing liquid to a value at which the dye loses its reactivity, before cleaning the waste dyeing liquid, the pH of the waste dyeing liquid is measured and then adjusted to the predetermined value by supplying the required amount of acid solution, for example, HCl and $H_2SO_4$ aqueous solutions, from the pH-adjusting vessel 22 into the dyeing tank 11 through the valve 33. Thereafter, the pH-adjusted waste dyeing liquid is circulated through the absorbing column 15 in order to accomplish the purpose of cleaning.

In the case where the waste dyeing liquid contains chromium mordant dye, the valves 23 and 24 are opened to allow the liquid to flow to the absorbing column 15 and the valves 25 and 26 are opened, and the waste dyeing liquid is circulated through the absorbing column 15 in order to remove the chromium mordant dye from the waste dyeing liquid. Then, the valve 23 and 24 are opened to allow the waste liquid to flow through the conduit 35, and the valves 25 and 26 are closed so as to retain the cleaned waste liquid in the dyeing system.

The cleaned waste dyeing liquid is augmented with necessary amounts of potassium dichromate and an auxiliary agent and circulated through the material 12 which has been dyed with the chromium mordant dye in order to color-develop the dye on the material by chromium. The valves 23 and 24 are opened to allow the waste liquid to flow into the ion-exchange column 16, and valves 29 and 30 are opened. By flowing the waste liquid through the ion-exchange column 16, the potassium dichromate remaining in the waste liquid is removed. Finally, the cleaned waste liquid is discharged out of the system by opening the valve 34.

The absorbing column 15 and ion-exchange column 16 are connected to tanks 17 and 18 and 19 and 20, respectively.

When the absorbing material in the absorbing column 15 is saturated, the valves 25 and 26 are closed, the valves 27 and 28 are opened to allow a rejuvenating liquid in the tank 17 to flow into the absorbing column 15 and thereafter, a rejuvenating liquid is supplied from the tank 17 into the absorbing column 15 through a pump 14a in order to rejuvenate the absorbing material.

After rejuvenating, the valves 27 and 28 are opened to allow the acid solution contained in the tank 18 to flow into the absorbing column 15, the acid solution is circulated through the absorbing column 15 in order to neutralize the absorbing material and at the same time, to wash it. By the above operations, the rejuvenation of the absorbing material is finished.

In the case where the ion-exchange resin in the ion-exchange column 16 is rejuvenated, the valves 29 and 30 are closed, an alkaline solution in the tank 19 is circulated into the column 16 through valves 31 and 32 by driving pump 14b and thereafter, an acid solution contained in the tank 20 flows into the ion-exchange column 16. By the above operations, the ion-exchange resin is reproduced.

FIG. 2 merely shows a system wherein the dyeing liquid is continuously circulated through the dye-absorbing material. However, it is possible that the dyeing liquid is divided into two or more portions and intermittently flowed through the circulation system containing the absorbing material. For example, a storage tank may be located between the absorbing column 15 and the dyeing tank 11 in order that a portion of the dyeing liquid is stored in the storage tank for a desired time, and then returned into the dyeing tank 11. In this case, although the dyeing apparatus becomes somewhat complicated, the treating efficiency of the apparatus is enhanced. Also, the volumn of the absorbing column is enlarged that it can be used as a storage tank for the dyeing liquid. However, in any case, it is necessary that the circulation system of the waste dyeing liquid is closely connected to the dyeing tank 11. If the circulation system is located too far from the dyeing tank 11, the advantages of the present invention, that is, economy of heat and water and compactness of the apparatus, are lost.

The following is an improved circulation type cleaning system of the present invention.

In this circulation type cleaning method of the present invention, the waste dyeing liquid is circulated through the dyeing system and the cleaning system containing the absorbing column, whereby the dye remaining in the waste dyeing liquid is removed and, at the same time, the dyed material is cleared with the cleaned waste liquid.

It should be noted that the circulation type cleaning method has the following disadvantages. When the dye-absorption of the material in the dyeing tank and the dye concentration of the dyeing liquid is in a equilibrium relationship, the dye absorbed in the material tends to return into the dyeing liquid with decrease of the dye-concentration of the dyeing liquid by absorption of the dye by the absorbing column. This tendency results in difficulty of lowering the dye-concentration of the waste dyeing liquid below a certain level. Of course, the dye-concentration in equilibrium varies in accordance with kind of dye and initial concentration of dye in the dyeing system.

Also, it is possible to lower the dye-concentration in the waste dyeing liquid substantially to zero by controlling the pH and temperature of the dyeing liquid. However, such control is undesirable from the viewpoint of efficiency and economy of the process. For example, although the absorption efficiency of dye can be enhanced by lowering the temperature of the waste dyeing liquid to 60° C. or less, such absorption at low temperature is uneconomical in heat and time because after cooling the dyeing liquid to the desired absorption temperature, it is necessary to reheat the liquid to the predetermined temperature at which the liquid is used for example, in clearing and after treating. That is, in chromium mordant dyeing, it is economical that after absorbing the dye in the waste dyeing liquid/without cooling, the waste dyeing liquid is successively, utilized for after-chroming the material at 90 to 95° C.

Also, the transfer of pH of the waste dyeing liquid to the acid side is effective for enhancing the absorption efficiency of anion dyes. However, such pH-transfer to the acid side is sometimes undesirable because such a low pH results in bad hand of the material and reabsorption of the dye in the waste dyeing liquid into the material.

Therefore, in this case, it is desirable to employ an improved circulation system of 2 or 3 steps. In the first or second step of this improved system, the dye in the waste dyeing liquid or on the material in excess is removed by the absorbing material in a relatively short time, and in the second or third step, the circulation system of the waste dyeing liquid through the dyed material is stopped in order to prevent the dyed material from losing dye, and the dye in the waste dyeing liquid is further absorbed by the absorbing material so as to lower the dye-concentration in the waste dyeing liquid substantially to zero. In this process, in order to completely absorb the dye in the waste liquid and prevent the dyed material from losing dye, it is desirable to control the pH and temperature of the waste dyeing liquid. That is, it is preferable that the waste dyeing liquid is kept at a temperature of 90° C. or lower, preferably 80° C. or lower, and at a pH of 5.0 or lower, more preferably, 4.0 or lower.

Figure 9:
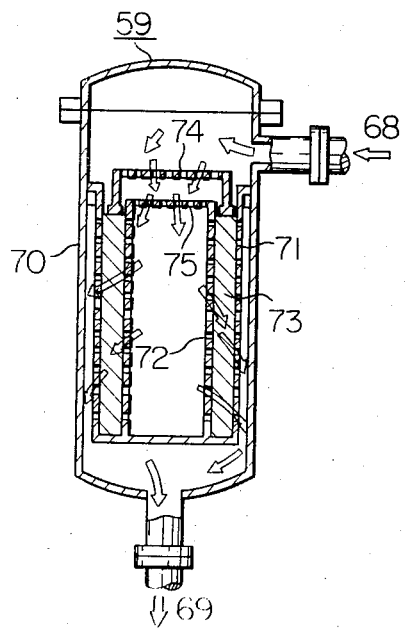

In the method of the present invention, there is another big problem in the circulation rate of the waste dyeing liquid. Of course, it is preferable for shortening the absorbing time of the waste dyeing liquid to enhance the circulation rate of the liquid waste dyeing liquid as much as possible. However, in order to increase the circulation rate, it is necessary to enlarge the effective diameter of the circulation conduit and to increase pressure to the absorbing column containing the absorbing material. Such measures result in undesirable enlargement of the apparatus and high cost in clearing the waste dyeing liquid. In order to carry out the clearing of the waste dyeing liquid at high efficiency, it is desirable that the absorbing column have a large internal area for effective flow of the waste dyeing liquid as shown in FIGS. 8, 9 and 10, and the circulation rate is restricted to a valve as small as possible. From the inventor's study, it was observed that the desirable circulation rate of the waste dyeing liquid is in the range ½ v. to v./min. where v. is the quantity of the dyeing liquid in the dyeing tank. When the waste dyeing liquid is circulated at the above-stated rate, the clearing is finished within about 10 minutes.

The above-stated improved method is further explained as follows.

Figure 3:
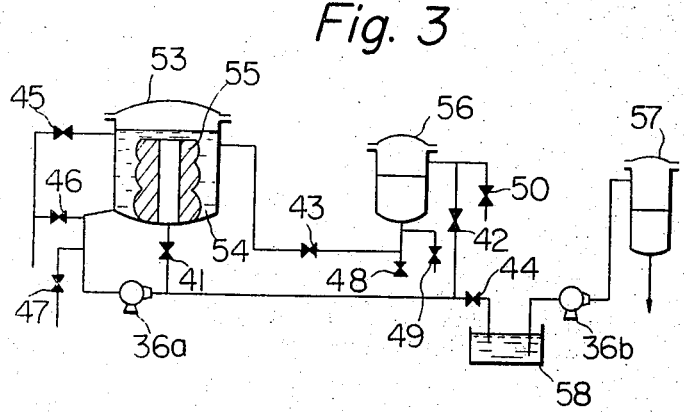

FIG. 3 shows one system for carrying out the method of the present invention. In FIG. 3, a dyeing tank 53 is charged with a material 55 to be dyed and a dyeing liquid 54. In order to carry out the dyeing, valves 45, 46, 47 and 43 are closed, valve 41 is opened, and the dyeing liquid 54 is circulated through the material 55 by a pump 36a. After the material 55 sufficiently absorbs the dye in the dyeing liquid 54 and the dyeing system reaches an equilibrium condition, the waste dyeing liquid is subjected to the treatment in accordance with the method of the present invention. The treatment is composed of three steps.

First step: An absorbing column 56 is charged with dye-absorbing material and contains an aqueous solution of acetic acid or formic acid at a predetermined pH. When valves 42 and 43 are opened and the valve 41 is closed, the pump 36a is driven so as to circulate the waste dyeing liquid from the dyeing tank 53 to the absorbing column 56 which contains dye-absorbing material. The dye in the waste liquid is absorbed by the absorbing material and thus the waste liquid becomes substantially colorless. This circulation is usually finished within 2 to 3 minutes.

Second step: After finishing the first step, valve 41 is opened, and valves 42 and 43 are closed. By driving the pump 36a, the colorless waste dyeing liquid is circulated through the material 55 and the dyeing liquid contained in the material 55 and dye absorbed in too large amounts on the material are washed by the waste liquid. This second step must be carried out as quickly as possible, because, if the circulation of the waste liquid is carried out for too long a time, the dye absorbed on the material 55 returns into the waste liquid. The time of the second step is determined in accordance with the circulation rate and clearing efficiency of the material 55, but this is generally within 2 to 4 minutes.

If the pump 36a has a sufficiently large capacity, it is preferable that the removal of the dye in the waste liquid by the absorbing column and the clearing of the material with the waste liquid are carried out at the same time by opening the valves 42 and 43 and controlling the circulation rate by suitable restricting valves located in the circulation system. In such a case, the first step can be frequently omitted.

Third step: After the second step is completed, valves 42 and 43 are opened and valve 41 is closed, and then the waste liquid from the second step is circulated through the absorbing column 56 for about 2 to 3 minutes so as to completely clear it by the absorbing material.

By the above operations, the treating of the material and the clearing of the waste liquid are completed.

When acid dyes, metallized acid dyes, reactive dyes or direct dyes are used for the dyeing, the material 55 is further rinsed with water by opening valves 45 and 47. In this rinsing, it is desirable that the operations of opening the valve 41 and actuating the pump 36a are carried out after the dyeing liquid 54 is cooled.

In chromium mordant dyeing, in FIG. 3, after opening the valve 41 and closing the valves 42 and 43, the necessary amount of potassium bichromate is added into the waste liquid in order to color-develop the mordant dye on the material. After the chroming is completed, valve 44 is opened, valve 41 is closed and the waste liquid is transferred into a pit 58 by a pump 36b. Thereafter, valve 41 is opened, valve 44 is closed, valve 47 is opened, and the material 55 is rinsed with water supplied through the valve 47. After the rinsing, the waste liquid is transferred into the pit 58. This rinsing may be repeated two or more times, if necessary.

The waste liquid transferred into the pit 58 is supplied into an ion-exchange column 57 containing ion-exchange resin in order to remove the chromate salt. By the above-stated operations, the treatment of the waste dyeing liquid is completed.

Figure 4:
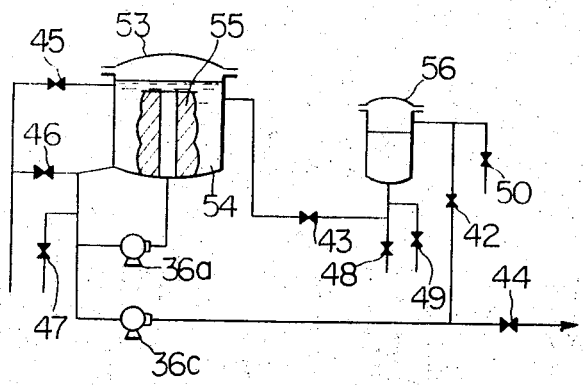

The system indicated in FIG. 4 is composed of three steps.

First step: After completing dyeing process for the material 55, the pump 36a is stopped, valves 42 and 43 are opened and the pump 36c is actuated. The waste dyeing liquid 54 is circulated through the absorbing column 56 and dye in the waste liquid is removed.

Second step: After the first step, the material 55 is cleared with the waste liquid by driving the pump 36a, stopping the pump 36c and closing valves 43 and 42.

Third step: The waste liquid from the second step is cleared by circulating along the same path as the first step. In this step, the pump 36a is stopped and the pump 36c is actuated.

In the above process of FIG. 4, the first step may be carried out at the same time as the second step or omitted. Particularly, in the case where the waste dyeing liquid contains only a very small amount of dye, the first step can be omitted. In the systems shown in FIGS. 5 and 6, the waste liquid 54 from the dyeing process is withdrawn from the dyeing tank 53 at a relatively high position thereof, flowed into the absorbing column 56 to remove the dye therein and returned into the dyeing tank 53 at a relatively low position thereof.

Figure 5:
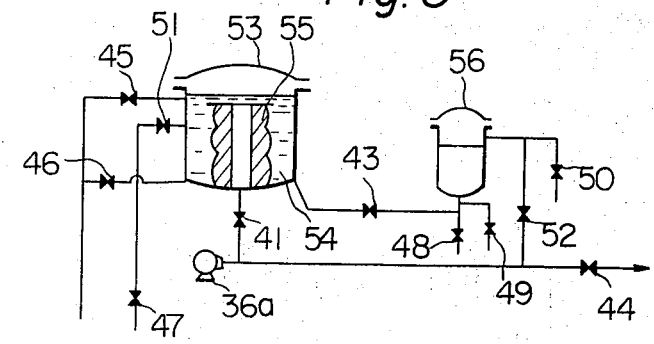

The systems of FIGS. 5 and 6 are essentially the same as those of FIGS. 3 and 4. In FIGS. 3 to 6, valve 46 is for discharging the liquid in the dyeing tank 53, and valve 49 is for discharging the liquid in the absorbing column.

The method of the present invention can be used to treat the waste dyeing liquid from a plurality of dyeing tanks using only one absorbing column by carrying out the treatments in accordance with a suitable treating program.

In the system shown in FIG. 7, two dyeing tanks 53a and 53b are connected to an absorbing column 56. In this case, each dyeing tank is connected or isolated by opening or closing valves 42a, 42b, 43a and 43b.

In order to enhance the absorption effect of the dye in the method of the present invention, it is important that the absorbing column has very large absorbing area through which the waste liquid flows.

The absorbing columns as shown in FIGS. 8, 9 and 10 have a large absorbing area. In these drawings, the waste liquid flows in the directions shown by the arrows. In FIG. 8, the waste dyeing liquid is fed into the absorbing column 59 through an entrance 60 and discharged through an exit 61.

The absorbing column 59 is provided with a cylindrical outside body 62 and a lid 63 closing the top end of the outside body 62. The absorbing material 64 is charged by opening the lid 63. In the outside body 62, an inside cylinder 66 and an intermediate cylinder 65 with apertures are located as shown in FIG. 8. The inside cylinder is fixed to the bottom of the outside body 62 and connected fluidly to the exit 61, and the intermediate cylinder 65 is fixed to the top end of the inside cylinder 66 by a bolt 67. The intermediate cylinder 65 is surrounded by the absorbing material 64. The waste dyeing liquid fed into the absorbing column 59 through the entrance 60 flows through the absorbing material layer 64, the intermediate cylinder 65 with apertures, and the inside cylinder 66 with apertures, and is then discharged through the exit 61. The absorbing material 64 usable for the absorbing column 59 of FIG. 8 may be any form of woven, knitted or non-woven fabric and can be easily wound around the intermediate cylinder 65. Also, the intermediate cylinder 65 may be wound with filamentary absorbing material in package form. Further, it is possible to locate concentrically, two or more intermediate cylinders with apertures and surrounded by the absorbing material between the inside and outside cylinders 66 and 62 in order to enhance absorbing capacity of the absorbing column.

In FIG. 9, the waste dyeing liquid is fed into the absorbing column 59 through an entrance 68 connected to the dyeing tank (not shown in FIG. 9), and discharged through an exit 69. Two cylinders 71 and 72 with numerous apertures are fixed to each other at the common bottom thereof and fitted into an outside cylinder 70.

Absorbing material 73 is filled in the space between the cylinders 71 and 72. The cylinder 71 is covered by a lid 75 at the top thereof and the absorbing material 73 is fastened by a lid 74 at the top thereof. The lids 74 and 75 have numerous apertures. The waste dyeing liquid fed through the entrance 68 flows through the apertures of the lids 74 and 75, the cylinder 72, the absorbing material layer 73 and the apertures of the cylinder 71, and is the discharged through the exit 69. The absorbing material 73 can be woven, knitted or non-woven fabrics hanked and wound yarns or loose fibers.

In the absorbing column as shown in FIG. 10, a plurality of cylindrical absorbing chambers are superimposed. The absorbing chambers 79, 84, 85 and 86 are each connected to a feed conduit 76 connected to the dyeing system (not shown) through flange 78a, and to a discharge conduit 77 through flange 78b. In each absorbing chamber, absorbing material 80 is arranged on a plate 81 with numerous apertures and fastened by a net 83. The waste dyeing liquid fed through the feed conduit 76 is distributed to the chambers 79, 84, 85 and 66 through the flange 78a and flows through the absorbing materials 80 and thereafter is discharged through the discharge conduit 77. The absorbing material 80 usable for the absorbing column 59 of FIG. 10 may be loose fibers, packages and hanked yarns or woven, knitted or non-woven fabrics.

The absorbing column is preferably made of a material having a high resistance to acid, to heat, alkali and pressure. For example, anti-corrosion alloys such as stainless steel, metallic materials having rubber, plastic resin or glass lining, and anti-corrosion and heat-resistant plastic materials such as fluorine-containing resins, epoxy resins and reinforced plastic resins are useful for forming the absorbing column.

In any case, it is necessary that the larger the flow rate of the waste dyeing liquid, the higher must be the resistance of the absorbing column to pressure. Also, in order to uniformly distribute the waste liquid to the absorbing chambers of FIG. 10, it is sometimes necessary to make the diameters of the pipes connecting the absorbing chambers and the feed conduit or discharge conduits different from each other in response to the pressures in the chambers.

Further, the absorbing column may be covered with a heat-insulating material in order to retain the temperature of the waste liquid at the desired level.

It should be understood that the absorbing column usable for the present invention is not limited to the embodiments as stated above.

As stated hereinbefore, it is advantageous that a plurality of dyeing systems are connected to only one absorbing column and the waste liquid from the dyeing systems are successively treated by the absorbing column with a predetermined time lag in accordance with an operation program. It is possible to treat the waste liquid from ten or more dyeing systems by one absorbing column.

The method of the present invention is useful for, especially, a dyeing machine in which the dyeing liquid is circulated through the material to be dyed such as for example, dyeing liquid circulation type package dyeing machines, beam dyeing machines, cheese dyeing machines. Needless to say, the method of the present invention is applicable to dyeing machines in which the material to be dyed is circulated through the dyeing liquid, for example, jigger dyeing machines and winch dyeing machines under normal pressure or high pressure. In such cases, it is important to control the pH, temperature and circulation rate of the dyeing liquid and the circulation of the material.

FIG. 11 shows a system wherein the material is dyed in a winch type dyeing machine, and the waste dyeing liquid is treated in accordance with the art of the present invention.

In the system of FIG. 11, a winch type dyeing machine 90 is provided with an oval winch frame 91, and a guide roll 92, and contains dyeing liquid 93 and material 94 to be dyed. An absorbing column 95 is connected to the winch type dyeing machine 90 through valves 98, 99, 100 and a pump 105. A pit 97 is connected to the dyeing machine 90 through valves 98 and 103 and a pump 105, an ion-exchange column 96 is connected to the pit 97 through a pump 104. The waste dyeing liquid from the winch dyeing machine 90 can be treated by the absorbing column and the ion-exchange column in the same procedure as stated hereinbefore.

The features of the present invention will be further apparent from the following examples.

In the following examples, the amount of dye contained in the dyeing liquid is determined by colorimetric analysis using a spectrophotometer, and the pH of the liquid is determined at a temperature of 25° C. using a pH meter. Further, the parts and percentages recited in the examples, unless specifically provided otherwise, refer to parts by weight and percentages by weight.

Example 1

A polyamide was prepared by polycondensing a mixture of 300 parts of a nylon salt consisting of equimolar of triethylenetetramine and terephthalic acid and 2,700 parts of ε-caprolactam in the presence of 3% of water under a normal pressure for 15 hours.

The polyamide had a relative viscosity of 2.62 which was determined in 1% solution in 95.8% sulfuric acid, and contained amino groups (including primary, secondary and tertiary amino groups) in an amount of 535 meq./kg.

The polyamide was treated with hot water and dried, and thereafter, subjected to melt-spinning. The result was a non-drawn filament yarn of 210 denier/18 filaments. The non-drawn polyamide filament yarn had a diluted dye absorption coefficient of 2.0 which was determined by the following method. That is, a dye solution having a dye concentration of 200 p.p.m. was prepared by dissolving Lanyl Brown 3R (trademark of a metallized acid dye made by Sumitomo Chemical Industrial Co., Ltd.) in water, and adjusted to a pH of 4.0 by adding acetic acid. One litre of the aqueous dye solution was adjusted to a temperature of 60° C. and 5 g. of the non-drawn polyamide filament yarn was treated in the aqueous dye solution in order to absorb the dye. After treatment for 30 seconds, the dye concentration of the aqueous dye solution was decreased to 5 p.p.m.

For comparison, the diluted dye absorption coefficient of a polycapramide filament yarn of 210 denier/18 filaments which was produced from a polycapramide having a relative viscosity of 2.75 and containing 24 meq./kg. of amino groups, was measured in the same aqueous dye solution as the above-stated. Even after treating over 2 hours, the dye-concentration was higher than 5 p.p.m. The diluted dye absorption coefficient of the comparison filament yarn was lower than 0.0084.

A 400 g. piece of polycapramide tricot was dyed in a dyeing solution containing 4% OWF of Lanyl Brown 3R in a 10 l. dyeing bath at a temperature of 90° C. and a pH of 4.0 for 1 hour. The waste dyeing liquid contained 108 p.p.m. of the dye. The waste dyeing liquid was flowed into an absorbing column.

The absorbing column was provided with a glass cylinder of inside diameter 10 cm. and height 5 cm., a metallic net filter of 20 mesh located at the upper portion of the glass cylinder and feed and discharge cocks located at the top and bottom of the glass cylinder. 200 g. of the above-prepared non-drawn polyamide filaments yarn was cut into 50 cm. lengths, arranged in the same direction, and bundled at one end thereof with a copper wire, and the bundles were hung on the net filter.

The waste dyeing liquid was fed into the absorbing column through the feed cock on the top end of the glass cylinder, and when the absorbing column was full of the waste dyeing liquid, the discharge cock was opened so as to discharge the waste liquid at the same flow rate as the feed flow rate through the feed cock. In this case, the feed and discharge rate of the waste dyeing liquid was 2 l./min.

When the waste dyeing liquid was discharged through the absorbing column, the waste liquid had a temperature of 82° C., a dye concentration of 1.1 p.p.m. and pH of 5.8.

The same polycapramide tricot as dyed above was dyed under the same conditions as the above using the cleaned waste liquid. This dyeing was effected without difficulty, and the waste dyeing liquid was cleaned by the absorbing column to a liquid having a dye concentration of 1.0 p.p.m., temperature of 80° C. and pH of 6.1. That is, the absorbing material charged in the absorbing column had a constant absorbing capactiy. The cleaning of the waste dye liquid was repeated and the dye concentration in the cleaned liquid was measured. The results are shown in Table 3 below.

TABLE 3

| Repeat number of the cleaning process | 5 | 10 | 20 | 30 | 35 | 40 |
|---|---|---|---|---|---|---|
| Dye concentration in cleaned liquid (p.p.m.) | 0.8 | 0.9 | 1.2 | 1.5 | 3.7 | 21.6 |

From Table 3, it is obvious that if the permitted limit of the dye concentration in the cleaned liquid is 1.5 p.p.m., the polyamide absorbing material of the present example can be repeatedly used for 30 cleanings.

When the absorbing capacity of the polyamide absorbing material fell to a level lower than the permissible limit, the absorbing capacity was rejuvenated by the following treatment. A rejuvenating solution was prepared by dissolving 5 g. of sodium hydroxide and 25 g. of sodium sulfite in 5 litres of water. This solution was supplied into the absorbing column at a temperature of 80° C. and circulated therethrough for 20 minutes, and then the column was washed with water. The polyamide absorbing material thus rejuvenated had a diluted dye absorbing coefficient of 1.9. Thus it is seen that the absorbing capacity of the polyamide absorbing material can be rejuvenated more than 90% with respect to the initial capacity.

Example 2

The same polyamide non-drawn filament yarn as that of Example 1 was drawn to a drawn filament yarn of 70 denier/18 filaments. 40 g. of the drawn filament yarn was cut to 40 cm. lengths and divided into four fractions each having a weight of 10 g. Each fraction was bundled by a fine thread at the center of the length and folded. The folded bundles prepared were incorporated into an absorbing material of 20 cm. length.

The diluted dye absorption coefficient of the absorbing material was measured by the same method as in Example 1 using Suminol Milling Red PG (trademark of Acid Red 85 made by Sumitomo Chemical Industrial Co., Ltd.), and was 2.2.

100 g. of wool top sliver was charged into a dyeing bath having an inner volume of 2 litres and dyed with a solution containing 5% OWF of Suminol Milling Red PG at a temperature of 90° C. and pH of 4.0 for 1 hour. The waste dyeing liquid contained 93 p.p.m. of dye.

After completing the dyeing process, the waste dyeing liquid was immediately, flowed into the absorbing column containing the absorbing material. The absorbing column was provided with a glass cylinder of an inside diameter of 3 cm. and a length of 25 cm., and a feed cock and a discharge cock located at the top and bottom ends of the glass cylinder. The absorbing material was hung on the top end of the glass cylinder by a fine thread. The waste dyeing liquid was fed into the absorbing column by opening the feed cock and when the column was filled with the waste liquid, the discharge cock was opened to allow the same flow rate as the feed rate. The discharge and feed rates of the waste dyeing liquid were 200 cc./min.

The cleaned waste liquid contained dye in a concentration of 0.4 p.p.m. and had a temperature of 84° C. and a pH of 5.7. The cleaned waste liquid was repeatedly used for clearing dyed material without difficulty.

When the absorbing column was repeatedly used for clearing the dyeing waste liquid, the cleaned liquid had the dye-concentration shown in Table 4. For comparison, the polyamide drawn filaments were charged in the absorbing column at random.

TABLE 4

| Repeat number of cleaning | Dye concentration, p.p.m. | | | | | | | |
|---|---|---|---|---|---|---|---|---|
| | 5 | 10 | 15 | 20 | 25 | 30 | 35 | 40 |
| Absorbing column: | | | | | | | | |
| The present example | 0.3 | 0.4 | 0.3 | 0.6 | 0.8 | 1.5 | 8.2 | 34.5 |
| Comparison example | 0.4 | 0.6 | 1.2 | 1.5 | 2.8 | 3.6 | 7.8 | 36.2 |

From Table 4, it is clear that the absorption of dye by the absorbing material of the present invention is higher in the case where the polyamide filaments in the absorbing column are bundled in parallel than the case where the polyamide filaments are located at random.

The same polyamide filament bundles as those used above were charged into the absorbing column in amounts double that of the above-mentioned. The cleaning of the waste dyeing liquid was effected without difficulty and the life of the absorbing column was doubled. Compared with this, in the case where the polyamide filaments were charged into the absorbing column at random in double amount, the resistance of the polyamide filaments to the flow of the waste liquid was increased and therefore, the discharge rate was decreased to less than 200 cc./min. Upon increasing the pressure of the waste liquid, the polyamide filaments were pressed to a high density, and therefore the discharge rate was further lowered.

Example 3

The same absorbing column as that of Example 2 was prepared in the same way.

A wool top sliver was charged into a 2 l. dyeing bath in an amount of 100 g. and dyed with a dyeing solution containing 3% OWF of Chrome Black TK Conc (trademark of Mordant Black 11 made by Adel) at a temperature of 90° C. and a pH of 3.5 for 40 minutes. Subsequently, the wool top sliver was after-chromed with 1.5% OWF of sodium dichromate added to the dyeing solution at 90° C. for 20 minutes.

The waste dyeing liquid had a pH of 4.6 and contained 23 p.p.m. of the dye and 106 p.p.m. of sodium dichromate. The waste dyeing liquid was fed into the absorbing column under the same conditions as in Example 2. The cleaned waste liquid included 0.6 p.p.m. of the dye and 6 p.p.m. of sodium dichromate and had a pH of 6.5. The same waste dyeing liquid as the above-stated was further fed into the absorbing column used above. The cleaned waste liquid included 0.6 p.p.m. of the dye and 5.0 p.p.m. of sodium dichromate and had a pH of 6.6.

In the above-stated procedure, the cleaning was carried out for the waste liquid after the chroming. However, it is possible for the waste liquid from the dyeing process to be cleaned before adding sodium dichromate into the dyeing solution, by flowing it through the absorbing column. The cleaned waste liquid is then returned into the dyeing bath and sodium dichromate is added, and then the dyed material is after-chromed.

Example 4

A dyeing bath having an inside volume of 2 litres was charged with 100 g. of wool top sliver. The wool top sliver was dyed with a dyeing solution containing 3% OWF of Cibacron Brilliant Blue BR (trademark of Reactive Blue 5 made by Ciba) at 95° C. at a pH of 4.0 for 40 minutes and thereafter, 0.3 cc./l. of 28% aqueous ammonia was added into the dyeing solution and the wool top sliver was treated with the solution at 90° C. for 20 minutes. The waste dyeing liquid contained 160 p.p.m. of the dye and had a pH of 7.6. After adding acetic acid into the waste dyeing liquid to adjust the pH to 5.0, the waste liquid was flowed through the same absorbing column as that of Example 2 under the same conditions as those of Example 2. The cleaned waste liquid included 0.9 p.p.m. of the dye. The absorbing column can be utilized repeatedly for the same results as above.

Example 5

A polycapramide filament yarn was dyed in the following dyeing solvent solution at a temperature of 80° C. at a liquor ratio of 1:50 using a cheese dyeing machine.

The dyeing solvent solution was prepared by dissolving 1% OWF of Ciba Solvent Dye Modified Acid Blue 40 (trademark of an acid dye made by Ciba) in a mixture solvent of 9 parts of tetrachloroethylene and 1 part of methyl alcohol. After discharging the filament yarn from the dyeing solvent solution, the waste solution contained 100 p.p.m. of the dye.

An absorbing material was prepared by the following procedure. A mixture of 4 parts of polyethyleneimine having a molecular weight of 1,800 (PET-18, trademark made by Dow Chemical Co.) and 96 parts of polycapramide having a relative viscosity of 2.70 which was determined in 1% solution in 95.8% sulfuric acid, was melt-spun at 265° C. using a 20 mm. $\varphi$ melt-spinning machine. The resultant non-drawn filaments were drawn to a filament yarn of 70 denier/18 filaments. The filament yarn was knitted to a tubular knitted fabric. The drawn filaments had a relative viscosity of 2.01 and contained 421 meq./kg. of amino groups.

The tubular knitted fabric was subjected to a measurement of the diluted dye absorption coefficient as follows. A dye solution was prepared by dissolving Ciba Solvent Dye Modified Acid Blue 40 in 1 litre of a mixture solvent of 9 parts of tetrachloroethylene and 1 part of methyl alcohol in a concentration of 200 p.p.m. Five grams of the tubular knitted fabric was treated with the dye solvent solution at a temperature of 60° C. with stirring. After treating for 30 seconds, the dye-concentration in the dye solvent solution was lowered to 5 p.p.m. That is, the diluted dye absorption coefficient of the tubular knitted fabric was 2.0. An absorbing column was prepared by charging 15 g. of the tubular knitted fabric into a glass tube of inside diameter 3 cm. and inside volume 60 cc. in a filling density of 0.25 g./cc. The dyeing waste solvent solution obtained in the above-stated dyeing process was flowed through the absorbing column at a temperature of 60° C. at a flow rate of 40 cc./min. The cleaned waste solvent solution had dye-concentrations changing with the lapse of time as shown in Table 5.

TABLE 5

| Time (minutes) | 10 | 20 | 30 | 50 | 100 | 200 |
|---|---|---|---|---|---|---|
| Dye-concentration (p.p.m.) | 0 | 0 | 0 | 0.5 | 0.5 | 1.0 |

From Table 5, it is seen that the cleaning is perfected within 30 or 50 minutes for the dyeing waste solvent solution, and thus, the cleaned solvent can be used for the solvent repeatedly.

The waste solvent solution flowed through the absorbing column used over 50 minutes can be perfectly cleaned by flowing it through the absorbing column twice.

Also, the results indicated in Table 5 show that the decrease of cleaning capacity of the absorbing column with lapse of time is derived from the decrease of the number of active dye absorbing sites in the polyamide filaments due to combination of the active amino groups with the dye molecules in the waste solution.

The tubular knitted fabric having a decreased absorbing capacity was rejuvenated by the following procedure. A solution was prepared by dissolving 0.4 g. of sodium hydroxide and 0.4 g. of Amiragine D (trademark of a surface active agent made by Nihon Kayaku Kogyo, Japan) in 200 cc. of water at a temperature of 80° C.

This rejuvenating solution was circulated through the absorbing column using a liquid transfer pump, and thereafter, the absorbing column was treated with a dilute acid solution and thereafter with water. The rejuvenated absorbing column had the cleaning capacity as shown in Table 6.

TABLE 6

| Cleaning time (minutes) | 10 | 20 | 30 | 50 | 100 | 200 |
|---|---|---|---|---|---|---|
| Dye-concentration (p.p.m.) | 0 | 0 | 0 | 0.5 | 0.7 | 1. |

From Table 6, it is clear that the rejuvenated absorbing column had a high cleaning capacity.

Example 6

A polyethylene terephthalate fiber fabric was continuously dyed with a dyeing solvent liquid by a continuous padding-thermosol dyeing method. The dyeing solvent liquid was prepared by dispersing 3 parts of Disperse Orange 38 in 97 parts of a mixture solvent consisting of 9 parts of tetrachloroethylene and 1 part of dimethyl acetamide. The dyeing waste solvent liquid contained 50 p.p.m. of the dye.

An absorbing material was provided by the following procedure. A mixture of 90 parts of polycapramide chips having a relative viscosity of 2.72 and 10 parts of polyethylene terephthalate chips having an intrinsic viscosity of 0.67 which was measured in o-chlorophenol at a temperature of 30° C. was melt-formed to chips at 275° C. using a three-member screw type extruder. 95 parts of the resultant chips were mixed with 5 parts of polyethyleneimine having a molecular weight of 1,200 (PEI-21, trademark made of Dow Chemical Co.), and the mixture was melt-spun to a non-drawn filament yarn of 200 denier/18 filaments. The filament yarn had a diluted dye absorption coefficient of 1.5 for Ciba Disperse Orange 38. The filaments were charged into a glass tube of inside diameter 3 cm. in parallel with each other in the same direction as flow direction of the waste solvent liquid so as to decrease the flow resistance of the fibers and increase the absorbing efficiency. The resultant absorbing column contained 30 g. of the filaments and had a length of 20 cm. That is, the filling density of the filaments was about 0.2 g./cc.

The dyeing waste solvent liquid containing the disperse dye was adjusted to a pH of 4 by adding acetic acid, and then flowed through the absorbing column at a temperature of 50° C. at a flow rate of 50 cc./min. in order to remove the dye. The dye-concentration of the waste liquid was as shown in Table 7.

TABLE 7

| Cleaning time (minutes) | 10 | 20 | 30 | 50 | 100 | 200 |
|---|---|---|---|---|---|---|
| Dye-concentration (p.p.m.) | 0 | 0.5 | 0.5 | 0.5 | 0.7 | 1.0 |

From Table 7, it is seen that the absorbing column of the present example is very effective for removing disperse dyes. The absorbing column was rejuvenated by the same method as that in Example 1.

Example 7

An absorbing column was prepared by the following procedure. A mixture of 4 parts of polyethyleneimine (trademark: PEI-18 made by Dow Chemical Co.) having a molecular weight of 1,800 and 96 parts of polycapramide having a relative viscosity of 2.70 measured in 1% solution in 98.5% sulfuric acid, which were sufficiently mixed previously, was melt-spun to a non-drawn filament yarn of 210 denier/18 filaments at 265° C. using a 25 mm. $\phi$ melt-spinning extruder. The filament yarn had a relative viscosity of 2.01 and contained 421 meq./kg. of amino groups.

It was ascertained by the following procedure that the filament yarn had a diluted dye absoption coefficient of 1.2 for Chromo Black BK (trademark of Mordant Black 15 made by Adel). The dye was dissolved in water in a concentration of 200 p.p.m. and the solution was adjusted to a pH of 4.0 by adding acetic acid.

One litre of the dye solution was heated to a temperature of 60° C. and thereafter, 5 g. of the non-drawn filament yarn was treated with the dye solution with stirring. It was observed that the dye-concentration of the dye solution fell to 5 p.p.m. after treating the filament yarn for 50 seconds.

The non-drawn filament yarn was bundled in lengths parallel to each other, and charged into an absorbing column 15 as shown in FIG. 2 which has an inside diameter of 60 cm. and a length of 180 cm. in an amount of 80 kg. in the same direction and the flow direction of the waste dyeing liquid at a filling density of 0.2 g./cm.$^2$.

An ion-exchange column was prepared by charging 120 kg. of an ion-exchange resin (trademark: Amberlite IRA–900, Type CL made by Rohm and Haas Co.) into a column 16 as shown in FIG. 12 which has the same dimensions as those of the absorbing column, at a filling density of 0.3 g./cm.$^2$.

A wool top sliver was dyed using a dyeing machine as shown in FIG. 2. In FIG. 2, 60 kg. of the wool top sliver 12 was dyed with 900 l. of dyeing solution containing 4% OWF of Chromo Black, 2K conc and controlled to a pH of 3.5 by adding acetic acid. The dyeing was begun at a temperature of 30° C. and the dyeing solution was gradually heated to 98° C. within 40 minutes and retained at this temperature for 30 minutes.

By the above dyeing, 98.5% of the dye in the dyeing solution was absorbed by the wool top sliver, and the waste dyeing liquid contained 40 p.p.m. of the dye. In the dyeing process, the valves 25, 26, 29 and 30 were closed, the valves 23 and 24 were opened, and the dyeing solution was circulated through the wool top sliver at a flow rate of 200 litre/min. by driving the pump 14.

When the dyeing was completed, the valves 25 and 26 were opened, and the waste dyeing liquid in the dyeing tank 11 was circulated through the absorbing column 15 by adjusting the valves 23 and 24 to a condition pertinent for the circulation. By the circulation, the dye in the waste liquid was absorbed by the absorbing material in the column 15 and after circulating for 7 minutes, the dye-concentration of the waste liquid was lowered to 1.5 p.p.m. The dye absorption was carried out at a temperature of 92° C.

Next, the valves 25 and 26 were closed and the valves 23 and 24 were changed to a condition pertinent for excluding the absorbing column from the circulation.

After adding 2% OWF of potassium dichromate into the cleaned waste liquid, the dyed wool top sliver was treated with the potassium dichromate solution in the cleaned waste liquid at 98° C. for 30 minutes, in order to color-develop the dye on the wool. After completing the 30 minutes treatment, the waste liquid contined 530 p.p.m. of potassium dichromate and less than 2 p.p.m. of the dye.

Subsequently the valves 29 and 30 were opened, and the valves 23 and 24 were charged to a condition pertinent for flowing the waste liquid through the ion-exchange column 16. Upon circulating the waste liquid for 10 minutes, the concentration of potassium dichromate in the waste liquid decreased to 2.5 p.p.m. This cleaned waste liquid was suitable for cleaning the dyed wool top sliver.

The durability of the absorbing column after the above-stated dyeing, dye absorbing, after-chroming and ion-exchanging were repeated, was measured. As a result, it was learned that the absorbing column can be used for 400 or more dye-absorptions and the ion-exchange column can be used for at most 100 ion-exchanges. In the case where the acid mordant dyeings were repeated at the rate of 6 times per day for 1 month using the dyeing and cleaning system of FIG. 2, it was observed that no lake of the dye complex was produced in the system. However, in the case where the same dyeings including the after-chroming with potassium dichromate were repeated without cleaning of the waste liquid at the rate of 6 times per day, the like of dye complex had adhered to the inside wall of the dyeing tank 11. Therefore, in this case, it was necessary to clean the inside wall at time intervals of one hour.

When the capacity of the dye absorbing and ion-exchange columns dropped after utilizing them for a long time, the columns were rejuvenated by the following procedure.

In FIG. 2, a rejuvenating solution for the absorbing column 15 was prepared from 0.2% of sodium hydroxide and 0.2% of Amirazin D and fed into the tank 17 and an amount of 800 litres and adjusted to a temperature of 85° C. After closing the valves 25 and 26 and adjusting the valves 27 and 28 to condition pertinent for circulating the rejuvenating solution through the tank 17, the rejuvenating solution was circulated through the absorbing columns 15 by driving the pump 14a at a flow rate of 200 litre/min. By circulating the rejuvenating solution for 40 to 60 minutes while retaining at a temperature of 80° C. or higher, the absorbing column was completely rejuvenated.

A $\frac{1}{10}$ N aqueous solution of hydrochloric acid was placed in the tank 18 in an amount of 800 litres. When the rejuvenation of the absorbing column was completed, the valves 27 and 28 were changed to positions pertinent for circulating the hydrochloric acid solution through the tank 18, and the solution was circulated through the absorbing column 15 at a temperature of 50° C. for 20 minutes in order to neutralize and wash the absorbing column. By the above circulation, the rejuvenation of the absorbing column was completed. A rejuvenating solution for the ion-exchange column 16 was prepared by dissolving 0.5% of sodium hydroxide in water and was fed into the tank 19 in an amount of 800 litres. Also, the tank 20 was filled with 800 litres of a $\frac{1}{10}$ N aqueous solution of hydrochloric acid.

Under the conditions where the valves 29 and 30 were closed and the valves 31 and 32 were in a position pertinent for circulating the liquid through the tank 19, the rejuvenating solution in the tank 19 was circulated through the ion-exchange column 16 by driving the pump 14b at a flow rate of 100 litre/min. for 40 to 60 minutes. After completing the circulation of the recovering solution, the values 31 and 32 were changed to portions pertinent for flowing the liquid in the tank 20 therethrough, and the acid solution in the tank 20 is circulated through the column 16 at a flow rate of 100 litre/min. to neuaralize and at the same time, to return the ion exchange resin to CL-type. By the circulation of the acid solution, the rejuvenation of the ion-exchange column was completed.

The rejuvenated cleaning system had a capacity of 80% or more with respect to the initial capacity thereof. Upon repeating the rejuvenation of the cleaning system ten times, the system had a capacity of 70% or more with respect to the initial capacity. In the dyeing of the present example, it was unnecessary to control the pH of the dyeing solution. Therefore, the pH controlling means 21 and 22 shown in FIG. 2 were not used in the present example. If the dye-absorbing material is discharged after cleaning the waste dyeing liquid, the rejuvenating means 17 and 18 are not used.

Example 8

A mixture of 300 parts of a nylon salt consisting of equimolar of triethylenetetramine and terephthalic acid and 2,700 parts of ε-caprolactam was polycondensed in the presence of 3% of water under normal pressure for 15 hours. The resultant polymer was washed with hot water and dried. The dried polymer was melt-spun and drawn to a filament yarn of 70 denier/18 filaments. A tubular knitted fabric was prepared from the filament yarn. The filament yarn had a relative viscosity of 2.32 and contained 540 meq./kg. of amino groups. The diluted dye absorption coefficient of the polyamide filament yarn for Cibacrolan Green G (trade mark of a reactive dye made by Ciba) was 1.0.

The same dyeing and cleaning procedures as those of Example 7 was repeated using the same dyeing and cleaning systems as those of FIG. 2 except for the following.

The absorbing column 15 in FIG. 2 was charged with 100 kg. of the above-prepared tubular knitted fabric made of the polyamide filament yarn in a filling density of 0.25 g./cm.$^2$. The tanks 18 and 20 were charged with 0.1% aqueous solution of sulfuric acid. 50 kg. of wool top sliver was dyed with 750 litres of an aqueous solution containing 2% OWF of the Cibacrolan Green G, at a liquor ratio of 1:15 at a pH of 3.3 which was adjusted by adding acetic acid. The dyeing was carried out by bringing the dyeing solution into contact with the wool top sliver at 30° C. in the dyeing machine 11, heating the dyeing solution to 90° C. with 40 minutes, and retaining the dyeing solution at this temperature for 30 minutes. Thereafter, the dyeing solution was adjusted to a pH of 8.5 to 9.0 by adding ammonia and the wool top sliver was treated with the dyeing solution for 20 minutes to fix the dye.

The waste dyeing solution contained the dye in a concentration of 145 p.p.m. The pH of the waste dyeing solution was measured by the pH-detecting device 21, and the acid solution in the tank 22 was added to the waste solution in an amount necessary for adjusting the pH of the dyeing waste solution to 5.0 by opening a valve 33. The added acid solution was uniformly mixed into the dyeing waste solution by operating the pump 14. Next, the valves 25 and 26 were opened and the valves 23 and 24 were opened for flowing the pH-adjusted waste solution through the absorbing column 15, and the waste solution was circulated through the absorbing column at a flow rate of 200 litre/min. After the circulation for 10 minutes, the dye concentration of the waste solution dropped to 2 p.p.m. or lower.

In the above-stated rejuvenation, it was unnecessary to utilize the ion-exchange column 16 or the rejuvenating tanks 19 and 20.

Example 9

An absorbing material was produced by the following procedure.

A mixture containing 2 parts of polyethyleneimine having a molecular weight of 1,200 (trademark: PEI–12 made by Dow Chemical Co.) and 98 parts of polycapramide having a relative viscosity of 2.70 which was measured in 1% solution in 95.8% sulfuric acid, was melt-spun at 260° C. to a non-drawn filament yarn of 500 denier/100 filaments using a 25 mm. φ melt-spinning extruder. The resultant polyamide filament yarn had a relative viscosity of 2.25 and contained 228 meq./kg. of amino groups.

The filament yarn was washed with hot water and dried. The dried filament yarn had a diluted dye absorption coefficient of 1.2 for Chromo Black BK. In the measurement of the diluted dye absorption coefficient, the dye was dissolved in water in a concentration of 200 p.p.m., the solution was adjusted to a pH of 4 by adding acetic acid. Five grams of the polyamide cut fibers was treated with 1 litre of the dyeing solution at a temperature of 60° C. with stirring. The dye concentration in the dyeing solution dropped to 5 p.p.m. after treating for 50 seconds.

The dyeing of a wool top sliver and cleaning of dyeing waste liquid was carried out using the system as shown in FIG. 4.

In FIG. 4, 25 kg. of a wool top sliver 55 were charged into the dyeing tank 53 containing 250 litre of a dyeing solution 54 of 1 kg. (4% OWF) of Chromo Black K conc and 250 g. (1% OWF) of formic acid in water, in a liquor ratio of 1:10. In order to dye the wool top sliver 55, the dyeing solution was heated from 40° C. to 95° C. within 1 hour and kept at this temperature for 30 minutes. The dye solution was circulated through the wool top sliver 55 at a flow rate of 350 litre/min. by operating the pump 36a.

The dye in the dyeing solution was absorbed by the wool top sliver in an amount of 98% with respect to the initial amount thereof, and the waste dyeing solution contained 80 p.p.m. of the dye.

The absorbing column 56 had an inside diameter of 45 cm., a length of 80 cm. and inside volume of 130 litre, and was provided with baskets 71 and 72 as shown in FIG. 9. The absorbing column 66 was charged with 4.5 kg. of the polyamide fibers at a filling density of 0.40 g./cc.

After completion of the dyeing process, 70 litre of water was fed into the absorbing column 56 by opening valves 48 and 50, and the waste dyeing solution was cleaned by circulating it through the absorbing column 56 at a flow rate of 270 litre/min. by driving a pump 36c shown in Table 7. The dye concentrations in the cleaned waste solution are shown in Table 8.

Next, 1.75 kg. (7% OWF) of sodium dichromate was added into the cleaned waste solution and the solution was circulated through the wool top sliver at 95° C. for 30 minutes for after-chroming the dyed woll top sliver. After completing the after-chroming, the valve 44 was opened, the pump 36c was started and the waste solution was fed into a pit 58 as shown in FIG. 3. In FIG. 3, the waste solution was fed from the pit 58 into the ion-exchange column 57 containing 50 litre of ion-exchange resin (trademark: IRA–900 type CL made by Rohm and Hass Co.) in a flow rate of 50 litre/min. by driving the pump 36b.

The cleaned waste solution and the dyed wool had the characteristics as shown in Table 8.

For comparison, the cleaning process was carried out as shown in Table 8.

TABLE 8

| | Cleaning time (minutes) | | | Dye concentration in cleaned waste liquid (p.p.m.) | Color of waste liquid after— | | Color fastness of dyed wool in rubbing |
|---|---|---|---|---|---|---|---|
| | First step | Second step | Third step | | After-chroming | Ion-exchanging | |
| The present example: | | | | | | | |
| A | 3 | 4 | 3 | 0 | Light yellow | Colorless | 5 |
| B | 0 | 7 | 3 | 0 | do | do | 5 |
| Comparison example: | | | | | | | |
| A | 3 | 7 | 0 | 25 | Brown | Light blue | 4–5 |
| B | 0 | 10 | 0 | 30 | do | do | 4 |
| C | 0 | 0 | 0 | 80 | Red brown | do | 3–4 |

From Table 8, it is clear that the dyeing waste liquid was completely cleaned by the art of the present invention and the dyed wool had a high color fastness in rubbing. That is, the art of the present invention is effective not only for cleaning the waste dyeing liquid but for enhancing color fastness of the dyed material.

Example 10

An absorbing material was prepared in the following procedure. A mixture of 13 parts of a nylon salt consisting of equimolar of N-N'-bis(γ-aminopropyl)piperazine and sebacic acid and 87 parts of ε-caprolactam was polycondensed at a temperature of 260° C. for 8 hours in an autoclave while flowing nitrogen gas therethrough. The resultant polymer was discharged through the bottom in a form of gut, cooled in water bath and cut to chips. The polymer chips were washed with water, dried and thereafter melt-spun to a filament yarn of 250 denier/100 filaments using a 20 mm. φ melt-spinning extruder. The resultant non-drawn filament yarn was formed into a knitting of 70 cm. width. The non-drawn polyamide filament yarn had a relative viscosity of 2.45 and contained 642 meq./kg. of amino groups.

The knitting has a diluted dye absorption coefficient of 1.5 for Carboran Blue BS (trademark of Acid Blue 138 made by I.C.I.).

The dyeing and cleaning was carried out using the apparatus as shown in FIG. 6. In FIG. 5, 75 kg. of a wool top sliver 55 was charged in a dyeing tank 53 which contains a dyeing solution 54 containing 2% OWF of Carboran Blue BS and 1.5% OWF of acetic acid. The dyeing of the wool top sliver 55 was carried out while raising the temperature of the dyeing solution from 40° C. to 95° C. for 60 minutes and keeping it at 95° C. for 30 minutes in a liquor ratio of 1:10. The dyeing solution was circulated at a flow rate of 900 litre/min. by operating the pump 36a.

The waste dyeing liquid contained the dye in an amount of 60 p.p.m.

The absorbing column 56 had an inside diameter of 48 cm., length 100 cm. and inside volume of 180 litre and contained 8 kg. of the polyamide knitting under conditions as shown in FIG. 8.

After completing the dyeing process, 100 litre of water was fed into the absorbing column 56 by opening the valves 48 and 50, and then the first, second and third cleaning procedures of the present invention were carried out at a flow rate of 750 litre/min. by operating the pump 36c for the periods as shown in Table 9. The cleaned waste liquid had a dye concentration as shown in Table 9. For comparison, the cleanings as shown in Table 9 were carried out.

TABLE 9

| | Cleaning time (minutes) | | | Dye concentration of cleaned waste liquid (p.p.m.) |
|---|---|---|---|---|
| | First step | Second step | Third step | |
| The present example | 3 | 4 | 3 | 0 |
| Comparison example: | | | | |
| D | 3 | 7 | | 12 |
| E | | 10 | | 15 |

From Table 9, it is clear that the dyeing waste liquid was perfectly cleaned by the method of the present invention.

As stated above, the waste dyeing liquid can be cleaned into a colorless liquid with high efficiency by the art of the present invention. Since the method of the present invention can be carried out using the simple and compact apparatus of the present invention, the art of the present invention is valuable for avoiding pollution and enhancing heat, water and solvent economies.

What is claimed is:

1. A method for cleaning waste liquids containing diluted anionic or disperse dyes which comprises the steps of contacting a waste liquid, containing at least one such dye dissolved in water or an organic solvent, with a polyamide fibrous absorbing material, essentially consisting of polyamide fibers which have a dye absorption coefficient of at least 0.5 for said dyes, said polyamide fibers essentially consisting of a polyamide having at least 150 meq./kg. of amino groups.

2. A method according to claim 1, wherein said polyamide is selected from the group consisting of a polycondensation product containing an amino compound selected from the group consisting of diethylenetriamine, triethylenetetramine, N,N' - bis-amino-propylethylenediamine, N,N' - bis-aminopropyl piperazine, and derivatives of polyamines wherein a hydrogen atom in the secondary amino group is substituted by an alkyl group, reacted with a dicarboxylic acid compound selected from the group consisting of adipic acid, cebasic acid, terephthalic acid and isophthalic acid; and the reaction products of the above mentioned polycondensation product with a primary polyamine having a molecular weight of at least 1000.

3. The method according to claim 1 wherein said organic solvent for said diluted dye is a mixture of tetrachloro ethylene with methylalcohol or dimethyl acetamide.

4. A method as claimed in claim 1, wherein said diluted dye absorption coefficient of said fibrous absorbing material is 1.0 or more.

5. A method as claimed in claim 1, wherein said polyamide is a reaction product of a polyamine having a molecular weight of at least 1000 with a primary polyamide.

6. A method as claimed in claim 5, wherein said polyamide further contains a component capable of interrupting crystallization of said polyamide.

7. A method as claimed in claim 5, wheerin said polyamide is selected from polyethyleneimines.

8. A method as claimed in claim 1, further comprising returning the cleaned waste liquid into the process from which said waste liquid is produced.

9. A method as claimed in claim 1, further comprising rejuvenating said fibrous absorbing material by treating with an alkaline solution and neutralizing with an acid solution.

10. A method of cleaning an aqueous waste liquid containing diluted anionic and disperse dye comprising circulating a waste liquid containing said diluted anionic dye or disperse dye through a fibrous absorbing material consisting of a polyamide having at least 150 meq./kg. of amino groups and having a diluted dye absorption coefficient of at least 0.5 for said dyes.

11. A method as claimed in claim 10, wherein said waste liquid is circulated through both said fibrous absorbing material and a material to be dyed.

12. A method as claimed in claim 11, wherein after circulating through both said fibrous absorbing material and said material to be dyed for a predetermined time, said waste liquid is circulated through said fibrous absorbing material only.

13. A method as claimed in claim 10 wherein said waste liquid is circulated through said fibrous absorbing material only, next, through both said fibrous absorbing material and a material to be dyed and thereafter, through said absorbing material only, for a predetermined period of time.

14. A method as claimed in claim 10, further comprising returning the cleaned waste liquid into the process from which said waste liquid is produced.

References Cited

UNITED STATES PATENTS

| | | | |
|---|---|---|---|
| 3,716,483 | 2/1973 | Renner | 210—40 |
| 3,170,757 | 2/1965 | Gift et al. | 8—173 X |
| 1,747,175 | 2/1930 | Mahler | 210—39 X |
| 2,055,686 | 9/1936 | Conrad | 210—40 X |
| 2,445,323 | 7/1948 | Galatioto | 8—81 X |

FOREIGN PATENTS

| 605,258 | 7/1948 | Great Britain | 8—81 |
|---|---|---|---|

SAMIH N. ZAHARNA, Primary Examiner

THOMAS G. WYSE, Assistant Examiner

U.S. Cl. X.R.

8—80, 81; 210—40